Sept. 15, 1936. J. MILLS 2,054,092
APPARATUS FOR FOOD PROCESSING
Filed Aug. 20, 1932 8 Sheets-Sheet 2

Fig. 2

Inventor
JOHN MILLS
By
Richey & Watts
Attorneys

Fig. 3

Sept. 15, 1936.  J. MILLS  2,054,092
APPARATUS FOR FOOD PROCESSING
Filed Aug. 20, 1932   8 Sheets-Sheet 4

Inventor
JOHN MILLS
By Richey & Watts
Attorneys

Sept. 15, 1936.   J. MILLS   2,054,092
APPARATUS FOR FOOD PROCESSING
Filed Aug. 20, 1932   8 Sheets-Sheet 6

Inventor
JOHN MILLS
By Richey & Watts
Attorneys

Patented Sept. 15, 1936

2,054,092

UNITED STATES PATENT OFFICE 2,054,092

APPARATUS FOR FOOD PROCESSING

John Mills, New York, N. Y., assignor, by mesne assignments, to The Crown Cork and Seal Company, Inc., New York, N. Y., a corporation of New York Application August 20, 1932, Serial No. 629,678

8 Claims. (Cl. 99—234)

This invention relates to means for treating and packaging food products. More specifically, it relates to apparatus for treating and packaging a wide variety of food products according to various methods, certain of which are disclosed and claimed in the copending applications of S. Henry Ayers and Charles W. Lang, Serial No. 629,718, filed August 20, 1932, and Serial No. 629,719, filed August 20, 1932, both of which are filed of even date herewith.

Apparatus embodying the present invention may be employed for treating and packaging fruit juices of the general character set forth in the above mentioned application, Serial No. 629,719 and with suitable changes and modifications is readily adaptable for use in treating and packaging milk products of the general character set forth in the aforesaid application Serial No. 629,718. Other variations and modifications of apparatus embodying the present invention may be made to adapt such apparatus to the treating and packaging of other food products. Apparatus embodying certain forms of the present invention and suitable for treating fruit juices is disclosed herein and a certain modification thereof is also set forth which adapts the apparatus to treatment and packaging of milk products.

In the drawings accompanying this specification.

Figure 1:
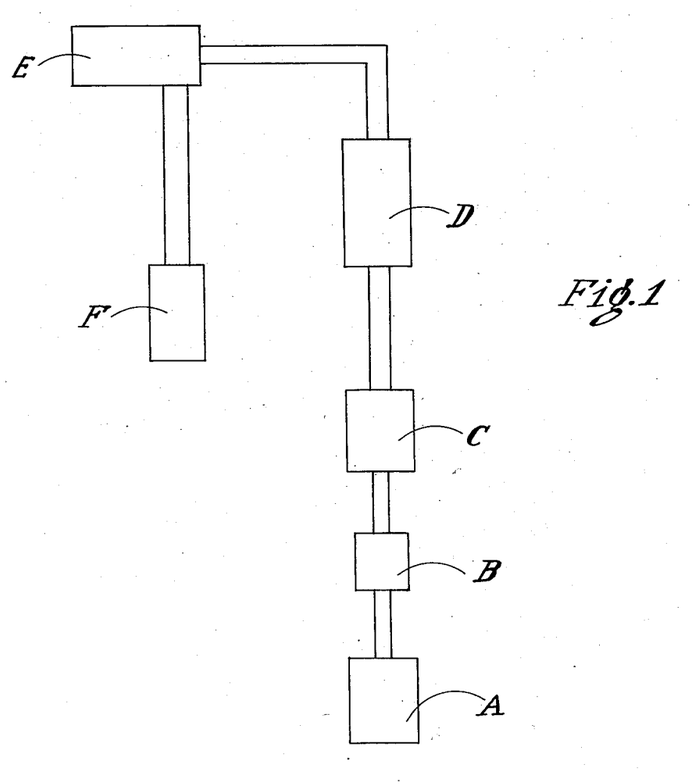
Figure 1 is a schematic view showing one arrangement of apparatus embodying the present invention and adapted for treatment and packaging of fruit juices according to the method set forth and claimed in the above co-pending application, Serial No. 629,719.

In Figure 1, wherein is shown a layout of apparatus for use in treating and packaging fruit juices, the various parts of the system are designated as follows: A represents the juice concentrator; B designates apparatus for filling the concentrated juice into containers, such as tin cans; C designates apparatus for attaching the top valved ends of the cans to the can bodies containing juice supplied thereto by the filling apparatus B; D designates apparatus for preheating the fruit juice in the containers; E designates the vacuumizing and sterilizing machine shown in more detail in other figures; and F designates apparatus for cooling the contents of the cans after having been suitably treated and after the can has been sealed permanently. It will be understood that the concentrated fruit juice is conveyed through a pipe line from the concentrator A to the filling apparatus B, and that suitable conveyors carry the cans from the filler B to the capping machine C, through the preheater D and delivers them to the machine E. Similarly, cans discharged from machine E may be conveyed to the cooler F by any suitable trough, table or conveyor.

Figure 2:
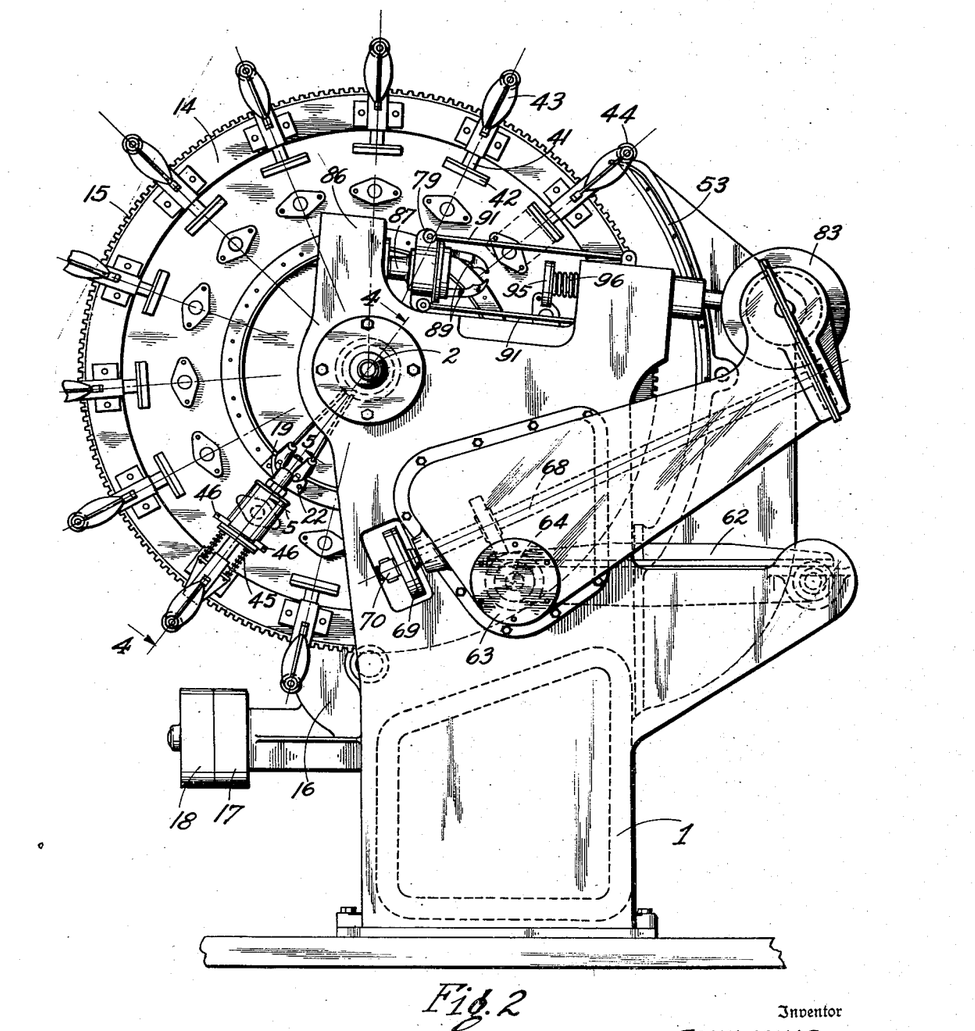
Figure 2 is a front elevation of apparatus for vacuumizing, sterilizing and sealing fruit juice in containers.
Figure 3:
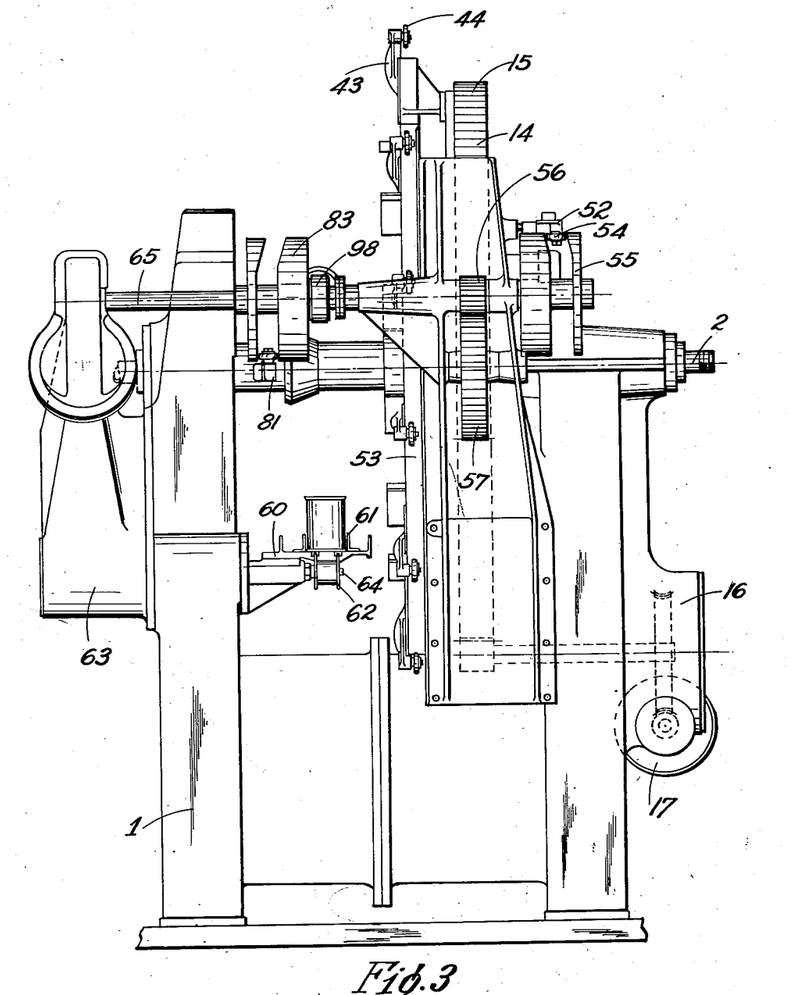
Figure 3 is a side elevation of the apparatus shown in Figure 2, viewed from the feeding side.
Figures 4, 5:
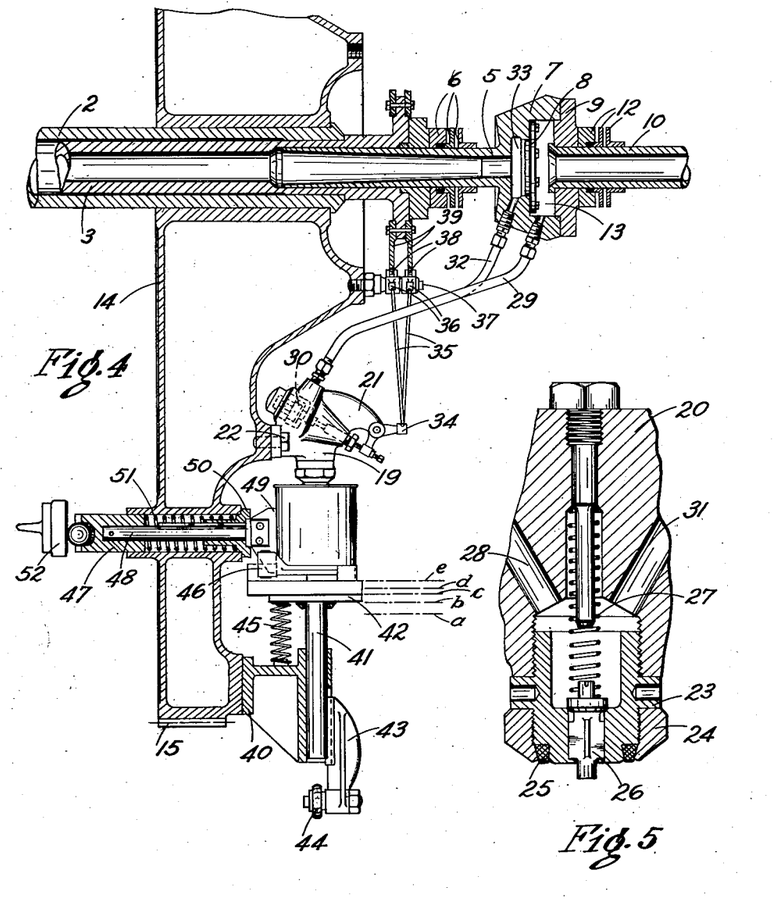
Figure 4 is a fragmentary radial sectional view, partly in elevation, taken on line 4—4 of Figure 2.
Figure 5 is an enlarged fragmentary sectional view taken on line 5—5 of Figure 2.
Figures 11, 12:
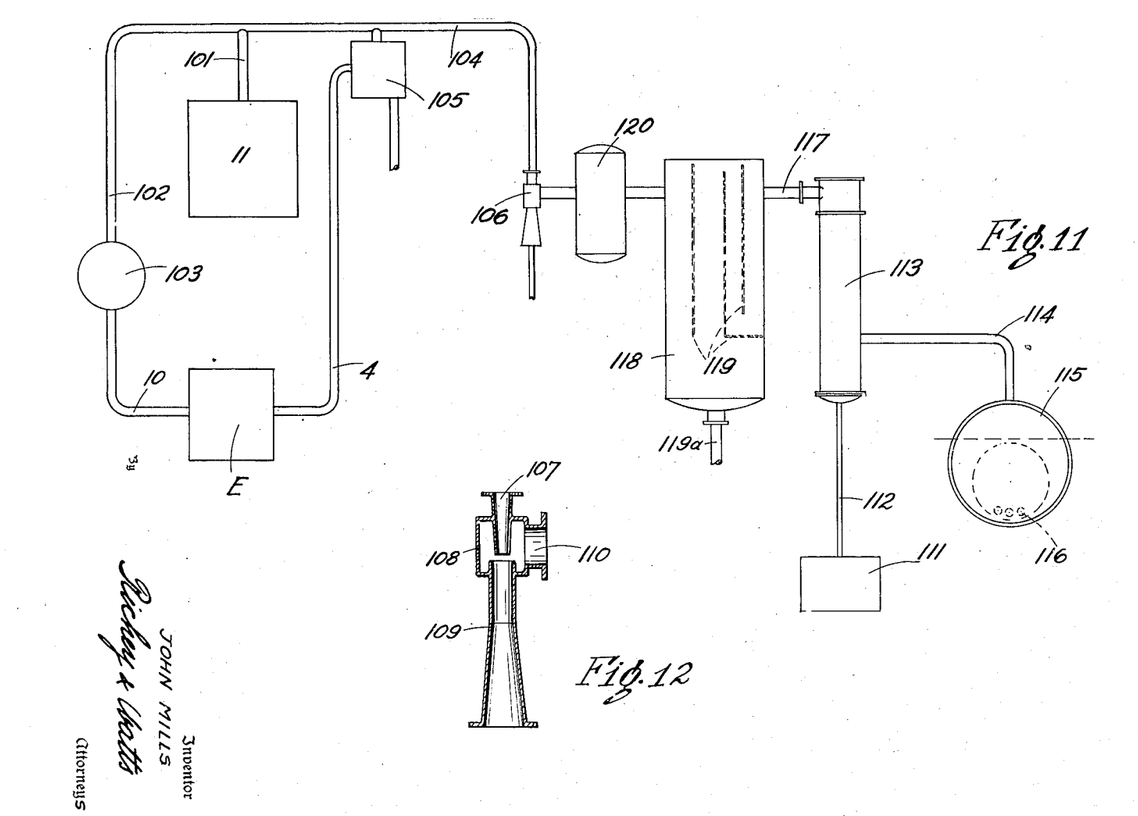
Figure 11 is a more or less diagrammatic view showing a system for concentrating and degassing fruit juices for supplying the machine of Figure 2 with steam under pressure, and for creating a vacuum in containers on such machine.
Figure 12 is a sectional view showing a part of the apparatus of Figure 1 employed to create a vacuum by use of steam.

Referring now more particularly to Figures 2, 3 and 4, I designates a suitable base provided with a hollow shaft 2 rotating on bearings (not shown). Within the shaft 2 is mounted a non-rotatable tube 3 connected at its outer end to a vacuum line 4 (Fig. 11). A rotating tube 5 extends into tube 3. A stuffing box indicated generally at 6 serves to prevent leakage of gas past tube 5 and into tube 3 when a vacuum is applied to the interior of the latter. The tube 5 carries an enlarged hollow head 7 equipped with a partition 8 and a cover 9 which encloses the open end of head 7 and carries a tube 10 attached to a source 11 (Fig. 11) of steam under pressure. A stuffing box indicated generally at 12 prevents escape of steam from compartment 13 formed in head 7 between the cover plate 9 and the partition 8.

On tube 2 is mounted a rotating turret 14 having gear teeth 15 on its periphery which mesh with a pinion located in housing 16 and is driven through the intermediary of suitable gears by drive pulley 17. 18 designates an idler pulley. The turret 14 carries a plurality of can stations. Since all the stations are alike only one has been shown in Figures 2 and 4 in substantially all details and only one will be described.

Each station includes a valve header 19 preferably composed of a casting 20 with integral arms 21 for supporting rocker arms and provided with suitable valves presently to be described. The header is firmly secured to the turret 14 as by cap screws 22. A valve seat 23 is screw-threaded into the outer end of casting 20 of header 19. A nut 24 is threaded onto the outer end of valve seat 23 and grips a gasket 25 between itself and the seat. This gasket serves to cushion the contact between the can and the header and at the same time to make a gas-tight connection between the header and the can. A valve 26 is seated in valve seat 23 by the expansive force of a compressed spring 27. The casting 20 is provided with a passage 28 which communicates through a small conduit 29 with chamber 13 in head 7. A valve 30 indicated by dotted lines in Figure 4 controls the passage of steam from chamber 13 into passage 28. The casting 20 is provided with a passage 31 similar to passage 28, the passage 31 communicating through a small conduit 32 with chamber 33 in head 7. A valve similar to valve 30 controls the passage of gas through passage 31 and conduit 32 under the influence of a source of a vacuum. The valves 30 controlling the flow of gases through passages 28 and 31 are seated against their seats by coil springs (not shown) located in the casting 20 and bearing against the valves 30. These valves are unseated by being moved against the compressive action of the springs by the following apparatus: The arms 21 of casting 20 carry similar rocker arms 34, one end of each arm carrying an adjustable tappet to engage the shank of the valve 30 and the other end being engaged by a push rod 35. The push rods are each engaged by the end of a rocker arm 36 mounted on a spindle 37 and having at their other ends rollers 38 which engage with cams 39 carried by the fixed tube 3.

The turret 14 carries, near its periphery, a bracket 40 in which is slidably mounted a slide 41 constituting a part of the can carrying table 42. The slide 41 carries a bracket 43 provided with a cam roller 44 at its outer end. Springs 45 are compressed between the bracket 40 and the table 42. Spring pressed fingers 46 mounted on table 42 serve to grip the can and hold it in predetermined position on the table.

At each station a knockout plunger 47 extends through turret 14. This knockout, as shown, consists of an outer member secured to member 48 which has an enlarged head 49 shaped to engage the can over a considerable portion of its length and intermediate the ends, and slides in a bushing 50, in one direction under the compressive action of spring 51, and in the other direction under the impelling force of a knockout arm 52.

The frame 1 is provided with a fixed cam 53 with which the rollers 44 of the table 42 engage when release of the cans from the turret 14 is desired. The cam 53 retracts or moves the table 42 outwardly and holds it in such retracted position until a can has been seated thereon.

The knockout arm 52 is pivoted to the frame 1 on the rear side of the machine and is actuated by the running of a cam roller 54 in a groove in drum 55. The drum 55 is mounted on a shaft driven by a pinion gear 56 which meshes with a gear 57, the latter meshing with the gear 15 on the turret 14. The knockout arm 52 is actuated by the drum 55 after the cam 53 has retracted the table 42 and freed the end of the can from contact with valve 26 of header 19.

Figures 8, 13, 14:
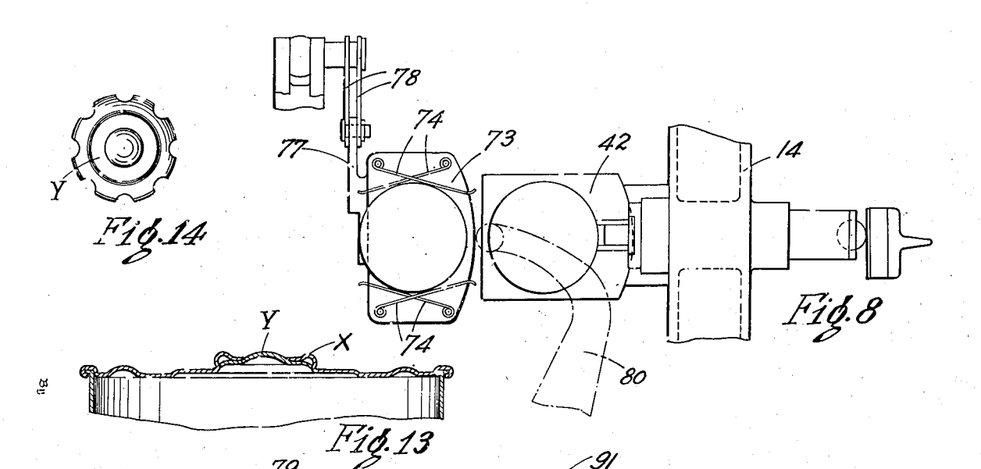
Figure 8 is a fragmentary side view showing the arrangement of parts for removing a container from the holding means shown in Figure 2.
Figure 13 is a sectional view showing a portion of a container equipped with a valve suitable for use with the machine of Figure 2.
Figure 14 is an elevational view of the movable part of the valve shown in Figure 13.

The operation of the device described thus far is briefly as follows: With the table 42 in retracted position, a can with a top end containing a valve X, as shown in Figures 13 and 14, is mechanically placed on the table 42 by apparatus presently to be described and is gripped by fingers 46. Rotation of the turret 14 carries roller 44 out of contact with the cam 53 and permits springs 45 to move the table radially inward toward shaft 2, bringing the can end into engagement with the gasket 25 and the stem of valve 26 into contact with the movable member Y of the can valve, depressing the latter and thereby opening the valve. When the can valve has reached the limit of its movement, spring 27 is compressed and the valve 26 is unseated. At such time the can is in a more or less upright position and the liquid therein will not run into the can valve. Vacuum is then applied to the can. The valve controlling passage 31 in casting 20 is opened by engagement of the corresponding roller 38 with cam 39 and resultant actuation of rocker arm 36, push rod 35 and rocker arm 34. The chamber 33 in head 7 is thus brought into communication with the interior of the can and gases are removed due to the vacuum existing in chamber 33. The roller 38 follows its cam 39 which permits the valve 30 to be closed under the action of the compressed spring, bearing thereon, when the can has been rotated through such an arc of the circle as will bring the liquid contents of the can up close to the can valve. Immediately thereafter, the interior of the can is brought into communication with chamber 13 of head 7 by the opening of the valve 30 which controls the steam passage 28. The actuation of this valve is similar in substantially all respects to the actuation of the vacuum line valve just described, but the steam valve is held open for a greater length of time. Steam passes from chamber 13 into the can until the roller 44 engages cam 53, and since during such time the can is being gradually turned to a bottom-side-up position, the steam passes into and through substantially all parts of the liquid in the can and causes violent agitation of such liquid. When the roller 44 engages the cam 53, the can and table 42 are moved away from the header 19, permitting the valve 26 to seat. At the same time the steam pressure within the can snaps the movable can valve member Y into valve closing position. The spring, engaging the steam valve 30, is released by the cam 39 at about the time the roller 44 engages the cam 53 and the valve 30 is thereupon seated.

When the table 42 has been retracted as just described, the kick-out lever 52 is actuated by the drum 55 and the can is freed from the fingers 46 and is thereafter handled by apparatus presently to be described.

Figure 6:
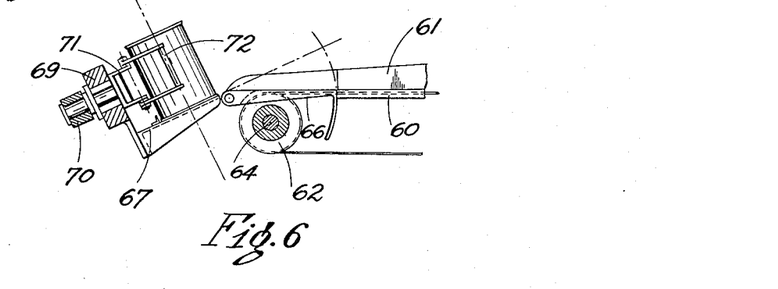
Figure 6 is a fragmentary elevational view, partly in section, showing details of the device for feeding containers to the holding apparatus of the machine shown in Figure 2.
Figure 7:
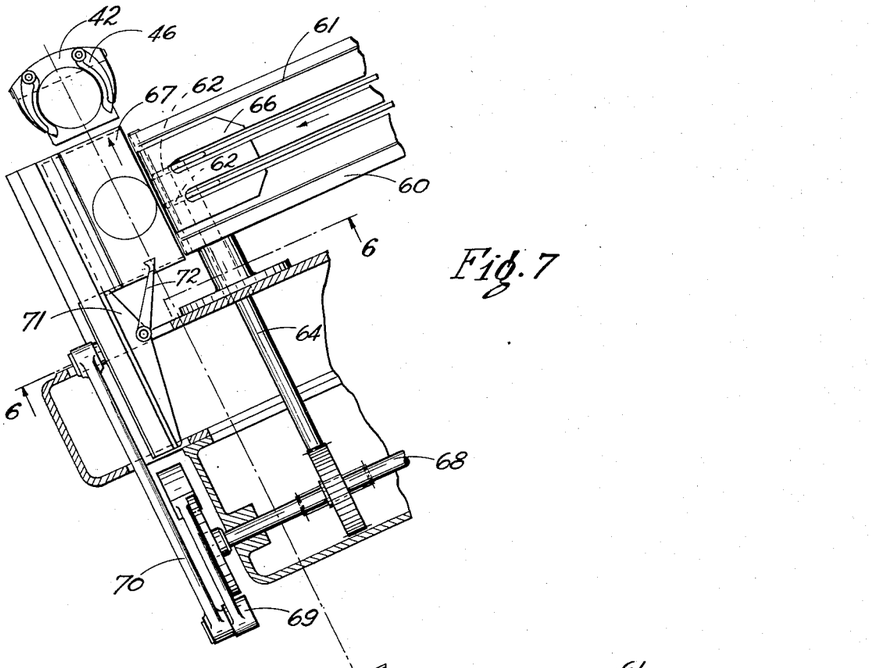
Figure 7 is a top plan view, partly in section, of the apparatus shown in Figure 6 and certain associated parts.

The apparatus for transferring the cans from a conveyor to the machine of Figure 3 is shown in some detail in Figures 6 and 7. On Figure 3 there is shown a fixed table 60 provided with parallel guides 61 between which the cans are moved by a conveyor driven by a sprocket 62. The sprocket 62 is keyed to a shaft 64 which extends through the front portion of frame 1 and into a housing 63 secured to the frame. This shaft 64 is driven by shaft 65 through the gearing indicated in dotted lines in Figure 2, on one end of which shaft 65 is mounted the cam drum 55, the shaft being driven by the gears 15 on turret 14 through the medium of the idler gear 57 and the pinion gear 56 on shaft 65.

Referring now more especially to Figures 6 and 7, it will be noted that the table 60 terminates in a pivoted tiltable end member 66. This member is large enough to accomodate one can and when tilted discharges the can by gravity onto a fixed table 67. The table 67 extends at right angles to the face of turret 14 and stops just short of contact with the table 42 on the turret. Cans on table 67 are transferred from the latter onto table 42 and are forced into seating position on the latter between the spring-pressed fingers 46 by suitable means. As shown, this means includes the following parts: The shaft 68, which, through gearing, is driven by shaft 65 and in turn drives shaft 64, carries at one end a crank 69, which drives the connecting rod 70 attached to a slide 71, the latter carrying a pusher 72 to propel a can along the table 67. By means of this gearing and the synchronism attendant upon the fact that the turret 14 drives the conveyor actuating shaft 64 as well as the pusher apparatus including slide 71, the transfer of a can from table 67 onto table 42 takes place when the two tables come into registry with each other.

Figure 9:
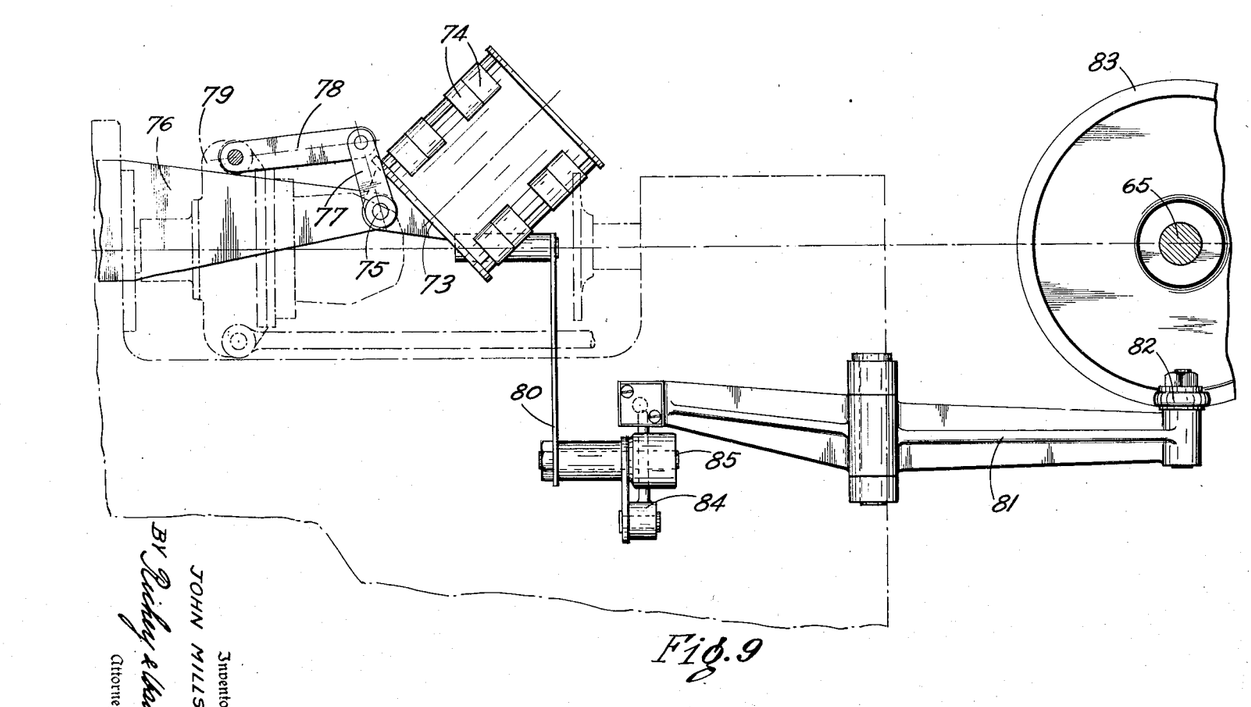
Figure 9 is a side elevation taken from the left hand side of Figure 8 and showing in full lines means for transferring a can from the apparatus shown in Figure 8 to a device for permanently sealing the can.

The means for transferring containers from the table 42 to the apparatus for permanently closing the cans is shown in Figures 8 and 9. In Figure 8 one table 42 and associated parts of the mechanism are shown. In front of table 42 is disposed a transfer cage 73 provided with flat springs 74, as indicated. When a can is pushed off the table 42 it is received in the transfer cage and held in place by springs 74. The cage 73 is mounted on a pivot 75 carried by a bracket 76 attached to the frame of the machine. Lever 77, an integral part of the cage 73, is pivoted to links 78, which in turn are pivoted to a movable jaw closing head 79. When the head 79 is moved from left to right, as viewed in Figure 9, the cage 73 is tipped so that the can moves into a horizontal position from which it may be transferred laterally into position in the clinching device. The arm 80 serves to force the can out of the cage and into the position shown in Figure 10. This arm 80 is actuated by the pivoted lever 81 carried on the front frame of the machine. At one end of arm 81 a cam roller 82 engages in a groove in drum 83 which is mounted on shaft 65. The opposite end of arm 81 is connected through link 84 to the arm 80, the latter being in effect one end of a crank mounted to rotate about a fixed shaft 85 and to be pivotally connected to the link 84.

Figure 10:
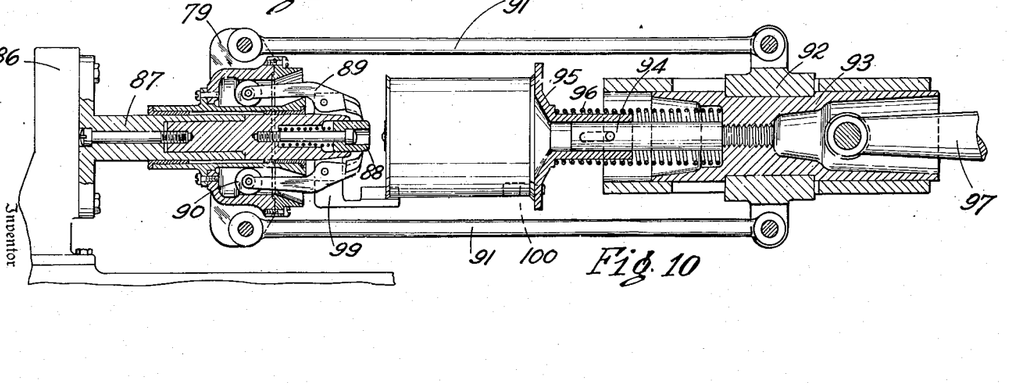
Figure 10 is a vertical sectional view, partly in elevation, showing means for permanently sealing a container.

The means for closing the container permanently is shown in Figure 10. This apparatus includes the bracket 86 attached to the main frame of the machine and carrying a spindle 87 provided at its frame end with a spring-pressed plunger 88 shaped and sized to fit the top of the valve X on the can. The spindle 87 has pivoted thereto near its free end a plurality of jaws 89 to engage the elevated part of the can top and crimp or force the same underneath the movable valve member Y thereby holding the latter in permanent, close seating contact with the cooperating valve part. Each of the jaws carries a roller 90 at its outer end. These rollers run in cam grooves in the head 79 which is reciprocable on spindle 87 and which is attached by rods 91 to blocks 92 carried by a plunger 93. The plunger 93 carries a spindle 94 on which is telescopically mounted a table 95 spring-pressed by spring 96. The plunger 93 is pivotally connected to an eccentric strap 97 surrounding an eccentric 98 keyed to shaft 65. Lugs 99 projecting from spindle 87 and lugs 100 projecting from table 95 serve as supports for cans in the clinching device.

When arm 80 has transferred a can from cage 73 onto the lugs 99 and 100 of the clinching device, the head 79 and plunger 93 are moved from right to left as viewed in Figure 10 under the action of the eccentric strap 97. The jaws 89 remain open, as shown in Figure 10, for a length of time sufficient for the valve of the can to come into contact with plunger 88 and be suitably positioned for the points of the jaws 89 to approach closely to the end of the can. By this time, the rollers 90 are traveling up to the cam surfaces in head 79 and the jaws 89 are being closed in around the elevated portion of the can valve and forcing it inwardly radially at substantially all points, thereby locking permanently the movable valve member in seated position. The eccentric strap 97 then reverses the movement of head 79 and plunger 93, opening the jaws 89 and releasing the can. Transfer of a succeeding can from cage 73 by the arm 80 pushes the closed can out of the clinching device and thus finally ejects the can from the machine.

In Figures 11 and 12 is shown a system of apparatus which has been found satisfactory in concentrating and treating fruit juices. In Figure 11, numeral 11 designates a stream generator from which extends a main steam line 101 having two branches. One branch, 102, leads to an equalizer 103 which is connected by line 10 to chamber 13 in head 7 of the machine shown in Figures 2, 3 and 4. The other branch, 104, leads to two vacuum producing devices 105 and 106, the former being connected by line 4 to the vacuum chamber 33 of head 7, and the latter being connected to the juice concentrating apparatus. Devices 105 and 106 are similar in construction but are shown as differing in size. Their construction is indicated in Figure 12 where steam under pressure from line 104 is delivered through chamber 108 into a Venturi-like outlet 109, the chamber 108 communicating through passage 110 to the line in which vacuum is desired. The rapid passage of steam under high pressure through the nozzle 107 creates a vacuum in the chamber 108 and sucks air and gases out of the line connected to passage 110.

The concentrating apparatus comprises a tank 111 containing a supply of fruit juice to be concentrated. The pipe 112 extends below the surface thereof and communicates with a plurality of small diameter metal tubes (not shown) disposed lengthwise of the heating chamber 113 in which they are surrounded with steam at low pressure passing thereinto through pipe 114 from steam generator 115. In the latter the steam is generated by passage of exhaust or low temperature steam through a plurality of tubes 116. The steam, condensing in the heater 113, is permitted to escape through a suitable drain (not shown). The juice-carrying tubes in heater 113 communicate through pipe 117 with a separating chamber 118 wherein baffles 119 are suitably arranged to intercept the fruit juice which enters the latter at high velocity, thus permitting the separation of gases, including water vapor, from the juices. The latter collect in the bottom of chamber 118 and are delivered through pipe 119a to the filling machine designated by B on Figure 1. The vapors separated from the juices in chamber 118 are condensed in chamber 120 and may be removed therefrom by any suitable draining means (not shown). The vacuum creating device 106 thus creates and maintains a high vacuum, for example, as much as about 27" of mercury in the system including chambers 120 and 118 and the juice-carrying tubes in heater 113.

The cans partly filled with fruit juices by filling machine B of Figure 1, are provided with valve ends, such as are shown in Figure 13, by a capping machine which crimps the can body and end together, and the contents of the can is then preheated by device D which may simply consist of an open ended chamber containing water heated by exhaust steam, in which water the cans are partly immersed while they are conveyed through the chamber by a suitable conveyor. This heats the juices in the cans to between about 120° F. and about 140° F.

The finally sealed cans and their contents may be cooled conveniently by permitting them to roll down an inclined trough into which cold water is sprayed onto the cans as they roll, the trough leading the cans into a bath of water or other cooling agent maintained at a desired temperature.

In Figure 4 different positions of the can supporting table 42 are indicated by a, b, c, d and e. The position of the top of the table when the table is in loading and unloading position is indicated at a. The position of the top of the table at the time steam is entering the can is indicated at b, this position being brought about by compression of springs 45 due to slight bulging of the can ends under steam pressure. The normal position of the top of the table with a can thereon, but with neither steam nor vacuum applied to the can is indicated at c. The position of the top of the table during the vacuumizing of the can, the ends of the can having been flexed inwardly slightly is indicated at d. The position of the top of the table in the free position and without any can thereon is indicated at e.

It is stated hereinabove that this specification would disclose modifications of the above described apparatus which would adapt it for use in treating and packaging milk products according to the process disclosed in the above mentioned application Serial No. 629,718. Modifications may be readily visualized by reference to Figure 1 wherein an evaporator of any standard suitable form and capable of concentrating milk or cream or other milk products to about 90% of their original volume is substituted for concentrator A. Between such an evaporator and the filling machine designated by B in Figure 1, there may be interposed a preheater and an homogenizing apparatus of any standard or suitable construction. The preheater D for heating the contents of the cans preliminary to treatment in the machine shown in Figures 2, 3 and 4, may be of a construction hereinabove described, but should be capable of heating the contents of the cans to between about 140° F. and 175° F. The machine designated on Figure 1 by E is that previously described. A heat sustaining device may be interposed between the machine E and the cooler F in place of the trough connecting E and F in Figure 1, or may be disposed between machine E and the trough. Such a heat sustaining device consists of an elongated open ended chamber having heat-insulated walls through which chamber the cans may be conveyed. This chamber may be provided with means for raising or maintaining the atmospheric pressure therein such as jets for steam or hot air.

This application is generic to the subject-matter hereof and the subject-matter of my co-pending application Serial No. 680,456, filed July 14, 1933.

Having thus described the invention so that others skilled in the art may be enabled to practice the same, what is desired to be secured by Letters Patent is defined in what is claimed.

I claim:

1. Apparatus comprising in combination a turret rotatable about a horizontal axis and carrying a plurality of container stations, a container supporting table at each station, and controllable means cooperable, during rotation of said turret, with the valve of the valved container on said table to connect the interior of the container, when in valve-end-up position with a source of vacuum and, when in valve-end-down position, with a supply of steam under pressure.

2. Apparatus comprising in combination a turret rotatable about a horizontal axis and carrying a plurality of container stations, a container supporting table at each station, and controllable means cooperable, during rotation of said turret, with the valve of the valved container on said table to connect the interior of the container, when in valve-end-up position with a source of vacuum and, when in valve-end-down position, with a supply of steam under pressure, said means including a header contacting with the container about the valved opening in the latter and means to open the valve.

3. Apparatus comprising in combination a turret rotatable about a horizontal axis and provided with a plurality of container stations, a container supporting table at each station, controllable means cooperable, during rotation of said turret, with the valve of the valved container on said table to connect the interior of the container, when in valve-end-up position with a source of vacuum and, when in valve-end-down position, with a supply of steam under pressure, said means including a header contacting with the container and valves in the header for opening and closing passages in the vacuum and steam lines.

4. Apparatus comprising in combination a turret rotatable about a horizontal axis and provided with a plurality of container stations, a container supporting table at each station, a head rotatable in synchronism with the turret and provided with chambers communicating respectively with sources of vacuum and steam under pressure, non-rotatable cams, and means including members engaging said cams for successively connecting the interiors of containers on each said supporting table in succession first with the vacuum chamber and then with the steam chamber in the said head.

5. Apparatus of the class described comprising in combination a turret rotatable about a horizontal axis and provided with a plurality of container stations, a container supporting table at each station, a feed table, means to transfer containers from the feed table to the supporting tables while they are in the lower portion of their orbit, a head rotatable in synchronism with the turret and provided with chambers respectively communicating with sources of vacuum and steam under pressure, means, including non-rotatable cams, adapted to connect said chambers successively with the interior of a container on said supporting table, and means operated in synchronism with rotation of the turret for removing containers from their supporting tables while they are in the upper portion of their orbit.

6. Apparatus of the class described comprising in combination a turret rotatable about a horizontal axis and provided with a plurality of container stations, a container supporting table at each station, a feed table, means to transfer containers from the feed table to the container supporting table on the turret, means adapted to connect the interior of containers on said supporting tables, while in the lower portion of their orbit, with a source of vacuum and a source of steam pressure, and, while in the higher portion of their orbit, with means for removing containers from the supporting tables after the containers have been connected with said steam source.

7. Apparatus of the class described comprising a turret rotatable about a horizontal axis and provided with a plurality of can supporting tables, means for delivering containers onto the said supporting tables, means for successively connecting the interior of a container on said table with a source of vacuum and with a source of steam under pressure, means for removing the containers from said supporting tables, and means for delivering such containers to a sealing device, all the aforesaid means being operated in timed relation with each other by means of driving connections actuated by the turret.

8. Apparatus comprising in combination a turret rotatable about a horizontal axis, container stations near the outer periphery of the turret and adapted to support containers arranged radially of the turret, steam line connections for each station, means at each station for opening the valve of a valved container at said station and means operable during movement of each such container in the upper portion of its orbit for admitting steam into the container below the level of liquid therein.

JOHN MILLS.